United States Patent
Fiedler et al.

(10) Patent No.: US 9,928,805 B2
(45) Date of Patent: Mar. 27, 2018

(54) VIDEO OUTPUT CHECKER

(71) Applicant: Renesas Electronics Europe Limited, Buckinghamshire (GB)

(72) Inventors: Peter Fiedler, Dusseldorf (DE); Sven Grundmann, Dusseldorf (DE); Tobyas Hennig, Dusseldorf (DE)

(73) Assignee: RENESAS ELECTRONICS EUROPE LIMITED, Buckinghamshire (GB)

( * ) Notice: Subject to any disclaimer, the term of this patent is extended or adjusted under 35 U.S.C. 154(b) by 192 days.

(21) Appl. No.: 14/774,819

(22) PCT Filed: Feb. 20, 2014

(86) PCT No.: PCT/EP2014/053369
§ 371 (c)(1),
(2) Date: Sep. 11, 2015

(87) PCT Pub. No.: WO2014/139773
PCT Pub. Date: Sep. 18, 2014

(65) Prior Publication Data
US 2016/0027406 A1    Jan. 28, 2016

(30) Foreign Application Priority Data
Mar. 11, 2013  (EP) .................................. 13158619

(51) Int. Cl.
*H04N 1/60*  (2006.01)
*G09G 5/02*  (2006.01)
(Continued)

(52) U.S. Cl.
CPC ......... *G09G 5/026* (2013.01); *G06F 11/1004* (2013.01); *G09G 5/06* (2013.01);
(Continued)

(58) Field of Classification Search
None
See application file for complete search history.

(56) References Cited

U.S. PATENT DOCUMENTS 5,781,206 A * 7/1998 Edge .................. H04N 1/40006
347/115
6,335,985 B1 * 1/2002 Sambonsugi ........ G06K 9/3241
382/190
(Continued)

FOREIGN PATENT DOCUMENTS

| EP | 2 493 189 A1 | 8/2012 |
| JP | H04 328420 A | 11/1992 |
| WO | WO 2009/141684 A1 | 11/2009 |

OTHER PUBLICATIONS

Notification of Transmittal of the International Search Report and the Written Opinion of the International Searching Authority, or the Declaration for International Application No. PCT/EP2014/053369 (dated May 8, 2014).
(Continued)

*Primary Examiner* — Joni Richer
(74) *Attorney, Agent, or Firm* — Jenkins, Wilson, Taylor & Hunt, P.A.

(57) ABSTRACT

A video output checker (23) is described. The video output checker is configured to receive incoming video data (20) for rendering an image on a display (17). The video data comprises pixel data which comprise, for each pixel (42), a set of color component values (57, 57 2, 57 3) for a given color model. The video output checker can be configured to compare each color component for a pixel in a selected area (24) of the image with a corresponding test range of values (5 1L, 5 1U, 5 2L, 5 2U, 5 3L, 5 3U) and, if a component value falls outside the range, to measure a deviation. The video 10 output checker can be configured to sum deviations for the selected area to provide an error value (58) for the selected area, and to compare the error value against a
(Continued)

threshold number (59). Additionally or alternatively, the video output checker can be configured to determine whether each color component for a pixel in a selected area (24) of the image falls within a corresponding test range of values (5 1L, 5 1U, 5 2L, 5 2U, 1 5 3L, 5 3U) so as to determine whether the pixel is valid or invalid and to count the number (58) of valid or invalid pixels in the selected area. The video output checker is configured to compare the number of valid or invalid pixels against a threshold number (59).

34 Claims, 16 Drawing Sheets

(51) Int. Cl.
    *G06F 11/10*     (2006.01)
    *G09G 5/06*     (2006.01)
    *G09G 5/14*     (2006.01)

(52) U.S. Cl.
    CPC .............. *G09G 5/14* (2013.01); *H04N 1/6027* (2013.01); *H04N 1/6033* (2013.01); *H04N 1/6058* (2013.01); *G09G 2320/103* (2013.01); *G09G 2340/10* (2013.01); *G09G 2340/12* (2013.01); *G09G 2340/125* (2013.01); *G09G 2340/14* (2013.01); *G09G 2380/10* (2013.01)

(56) References Cited

U.S. PATENT DOCUMENTS

| | | | |
|---|---|---|---|
| 6,493,011 B1* | 12/2002 | Shioya | H04N 1/506 347/116 |
| 8,699,826 B2* | 4/2014 | Remedios | G06F 17/3025 382/162 |
| 8,736,899 B2* | 5/2014 | Kim | H04N 1/6027 358/1.9 |
| 2004/0227964 A1* | 11/2004 | Fujino | H04N 1/622 358/1.9 |
| 2005/0151424 A1 | 7/2005 | Hirosue | |
| 2006/0029287 A1* | 2/2006 | Hayashi | G06T 5/50 382/261 |
| 2007/0046670 A1 | 3/2007 | Hedrick et al. | |
| 2007/0046680 A1 | 3/2007 | Hedrick et al. | |
| 2007/0276581 A1* | 11/2007 | Bae | G08G 1/16 701/117 |
| 2012/0036418 A1 | 2/2012 | Morino et al. | |
| 2012/0050612 A1 | 3/2012 | Schutt et al. | |
| 2012/0075328 A1* | 3/2012 | Goossens | G09G 5/06 345/592 |
| 2013/0076763 A1* | 3/2013 | Messmer | H04N 1/6058 345/506 |
| 2013/0135366 A1* | 5/2013 | Araki | G09G 3/3607 345/690 |
| 2013/0249931 A1* | 9/2013 | Morimoto | H04N 9/68 345/589 |

OTHER PUBLICATIONS

Extended European Search Report for European Application No. 131586190 (dated Jul. 22, 2013).

Office Action for Japanese Patent Application No. 2015-562003 (dated Aug. 30, 2017).

* cited by examiner

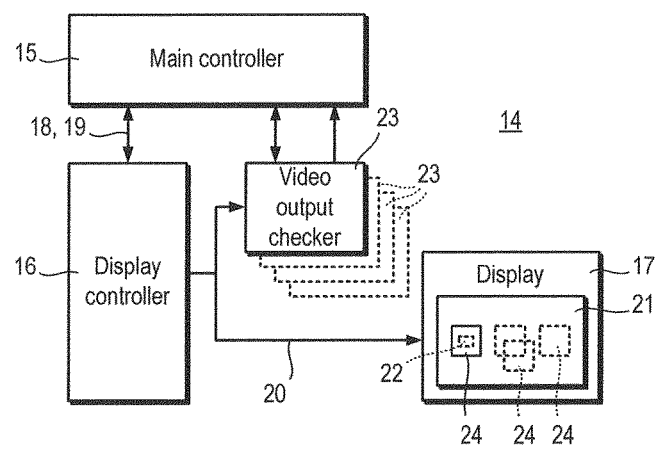
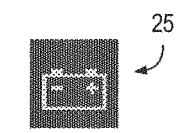
Fig. 5
Fig. 5a
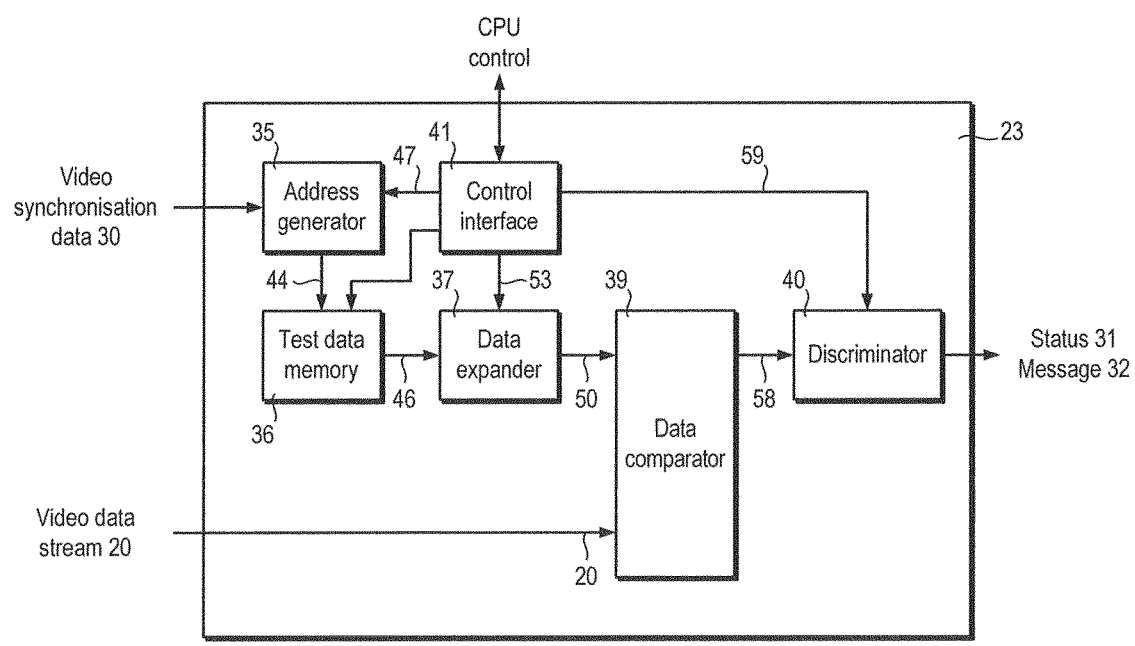
Fig. 6

| Index value | Component 1 | | Component 2 | | Component 3 | |
|---|---|---|---|---|---|---|
| | Min. value | Max. value | Min. value | Max. value | Min. value | Max. value |
| 0 | $C1_{0,L}$ | $C1_{0,H}$ | $C2_{0,L}$ | $C2_{0,H}$ | $C3_{0,L}$ | $C3_{0,H}$ |
| 1 | $C1_{1,L}$ | $C1_{1,H}$ | $C2_{1,L}$ | $C2_{1,H}$ | $C3_{1,L}$ | $C3_{1,H}$ |
| 2 | $C1_{2,L}$ | $C1_{2,H}$ | $C2_{2,L}$ | $C2_{2,H}$ | $C3_{2,L}$ | $C3_{2,H}$ |
| 3 | $C1_{3,L}$ | $C1_{3,H}$ | $C2_{3,L}$ | $C2_{3,H}$ | $C3_{3,L}$ | $C3_{3,H}$ |
Fig. 11
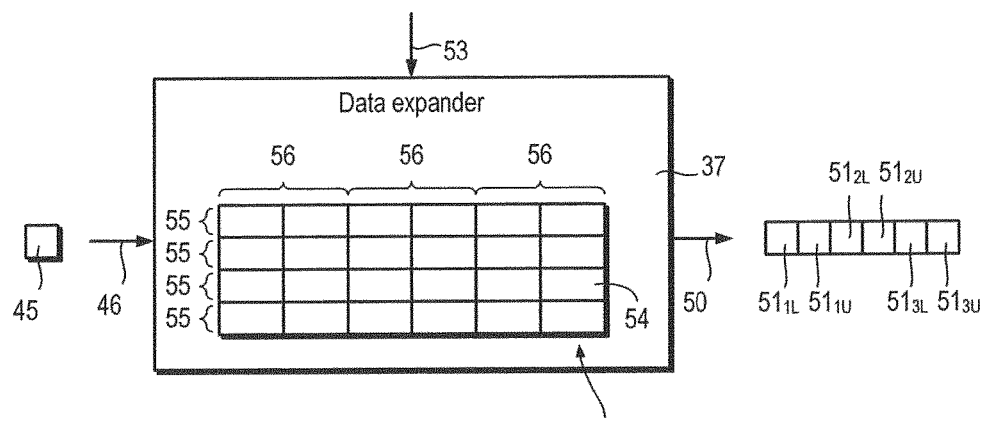
Fig. 12
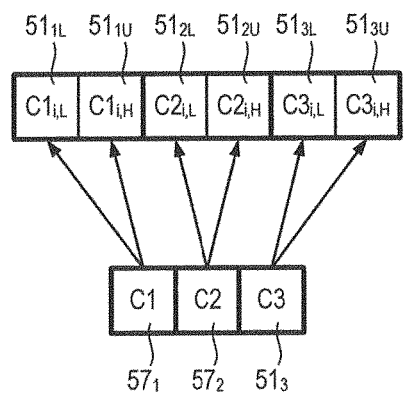
Fig. 13

VIDEO OUTPUT CHECKER

The present invention relates to a video output checker for particular, but not exclusive, use with a display for a vehicle instrumentation cluster.

Warning messages in an instrumentation cluster are often displayed as warning lights (usually referred to as "telltales"). Examples of warning messages include an airbag control telltale indicating that the airbag is not functioning or anti-lock breaking system (ABS) telltale indicating that ABS is not functioning.

It is usually necessary to ensure that a warning message, if displayed, can in fact be seen by the driver. Proper display of warning messages in an instrumentation cluster can be checked. For example, if light emitting diodes (LEDs) are used to display a warning message, then an LED current monitor or even a photo detector can be used confirm that a warning message is in fact being displayed.

With the introduction of liquid crystal display thin film transistor (LCD-TFT) screens in instrumentation clusters, warning messages can also be displayed on LCD-TFT screens as so-called "virtual telltales". Proper display of virtual telltales is usually also required. It may not be necessary to monitor proper operation of the whole display, but just of an area where virtual telltales are displayed.

One solution is to employ external cameras or image sensors to monitor the relevant area of the LCD-TFT screen. However, such dedicated monitoring requires additional resources for capturing and data processing.

Another solution is to employ hardware which reads back display content sent to an area of the TFT screen as close as possible to input pins of the screen, calculate a checksum for the content over this area and compare the checksum with a software-generated expected checksum. If the calculated checksum does not match the expected checksum, a message is passed to application software so that the application software can take appropriate action, such as issue an audio warning.

Typical checksum algorithms, such as CRC32, generate a different checksum value even if a single bit in a data stream is different. Therefore, such checksum algorithms may not be particularly suited to some forms of virtual telltale.

Examples of situations when checksum algorithms may not be adequate will now be described with reference to FIGS. 1 to 3.

Referring to FIG. 1, an image 1 comprising a single colour 2 and a background colour 3 may be modified by using patterning to generate a modified image 4 comprising additional virtual colour(s) $5_1$, $5_2$, $5_3$.

Dithering or unintentionally-added noise can mean that a checksum algorithm cannot be used without continually generating error messages.

Referring to FIG. 2, a telltale 6 (which in this case takes the form of a triangle warning symbol) can be laid over live video 7 (which in this case takes the form of an image from a camera showing a car on a road).

It may difficult to check whether the telltale 6 is properly displayed using a checksum algorithm because the background image 7 is unpredictable.

Referring to FIG. 3, a speedometer 8 is shown. Part of a telltale 9 is hidden, for example, by a virtual instrument needle 10.

Again, the checksum is likely to generate an error even though the displayed content is correct.

Examples of video output checkers which employ CRC algorithms are described in US 2012/0036418 A1 and US 2012/0050612 A1.

The present invention seeks to provide an improved video output checker for use with, for example, a LCD-TFT screen and other types of displays.

According to a first aspect of the present invention there is provided a video output checker. The video output checker is configured to receive incoming video data for rendering an image on a display, the video data comprising pixel data which comprise, for each pixel, a set of colour component values for a given colour model (such as RGB).

The video output checker can be configured to compare each colour component for a pixel in a selected area of the image with a corresponding test range of values and, if a component value falls outside the range, to measure a deviation. The video output checker can be configured to sum deviations for the selected area to provide an error value for the selected area and to compare the error value against a threshold number.

The threshold number may be set to a value of at least 1% and no more than 10% of a maximum possible error for in the selected area (i.e. maximum deviation per component multiplied by the number of components multiplied by the number of pixels in the selected area). For example, the threshold number may be set to 5% of a maximum possible error for in the selected area.

Additionally or alternatively, the video output checker can be configured to determine whether each colour component for a pixel in a selected area of the image falls within a corresponding test range of values so as to determine whether the pixel is valid or invalid and to count the number of valid or invalid pixels in the selected area. The video output checker can be configured to compare the number of valid or invalid pixels against a threshold number.

The threshold number may be at least 50% of the number of pixels in the selected area. For example, the threshold value may be 90% or more of the number of pixels in the selected area.

Thus, in either case, the video output checker can tolerate a greater variety in colour when checking the content of an image in the selected area which may be caused by, for example, dithering or laying content over video, or due to, for example, partial obscuration of the content by other content.

The video output checker may be configured to set each range of values to be full range for preselected pixels thereby forcing the preselected pixels to be deemed to fall within range or be valid.

Thus, the video output checker can more easily ignore certain parts of the image and can thereby tolerate a greater variety in the shape and/or colour of content of interest.

The video output checker may be configured to store test data comprising test pixel data which comprise, for each pixel, an index identifying one of a predetermined number of colours or whether colour is unimportant (i.e. indicating "don't care"), and to convert the index into a set of ranges of values.

This can be used to help reduce the amount of memory needed to store test data. For example, an index may be used which may take four values. This can be used to indicate one of three colours or that the colour of a pixel is unimportant (i.e. "don't care").

The set of colour component values may comprise a set of three colour component values. The given colour model may be the RGB colour model and so the colour components may comprise red, green and blue. The component values may take a value lying between 0x0 and 0xF. The component values may take a value lying between 0x00 and 0xFF.

The test values may be programmable and/or the threshold number may be programmable. Thus, the test values and/or threshold number can change and so the video output checker can adapt according to different conditions.

The video output checker may comprise a first unit (or "data comparator") configured to determine whether each colour component for a pixel in a selected area of the image falls within a corresponding test range of values so as to determine whether the pixel is valid or invalid and to count the number of valid or invalid pixels in the selected area.

The video output checker may comprise a second unit (or "discriminator") configured to compare the number of valid or invalid pixels against a threshold number.

The data comparator and discriminator may be separate units or may be integrated into a single unit.

The video output checker may comprise a third unit (or "data expander") configured to receive test data comprising test pixel data which comprise, for each pixel, an index identifying one of a predetermined number of colours or whether colour is unimportant, and to convert the index into a set of ranges of values The video output checker may comprise an interface to receive instructions for setting the test range values and/or the threshold.

The video output checker may be configured, after checking the selected area, to generate a signal at the end of a frame indicating that the check has been completed and to determine whether the signal is generated within a given time window.

This can be used to check whether the incoming video output and/or checking process is/are operating correctly.

The video output checker may be configured to check a first selected area in a first frame and to check a second selected area in a second frame.

This can be used to help reduce the amount of hardware needed to check multiple telltales.

The video output checker may be configured to check a first selected area on a first display and to check a second selected area on a second display.

The video output checker may be configured to receive and operate synchronously with a video output pixel clock.

The video output checker is preferably implemented as hardware logic.

The selected area may comprise an image or partial image of a telltale.

The image may be a frame. The frame may be a frame in a sequence of frames. The image may have an RGB444 image format. The image may be a static image.

According to a third aspect of the present invention there is provided a system comprising at least two video output checkers, each video output checker configured to check the video data in respective selected areas of the image.

According to a fourth aspect of the present invention there is provided a system comprising a display controller for generating video data for rendering on a display and at least one video output checker configured to receive and check the video data in the (respective) selected area(s) of the image.

According to a fifth aspect of the present invention there is provided an integrated circuit comprising one video output checker, at least one video output checker or at two least video output checkers.

According to a sixth aspect of the present invention there is provided an integrated circuit comprising a display controller for generating video data for rendering on a display and at least one video output checker configured to receive and check the video data in the (respective) area(s).

According to a seventh aspect of the present invention there is a method of checking a video output. The method comprises receiving incoming video data for rendering an image on a display, the video data comprising pixel data which comprise, for each pixel, a set of colour component values for a given colour model, determining whether each colour component for a pixel in a selected area of the image falls within a corresponding test range of values so as to determine whether the pixel is valid or invalid and to count the number of valid or invalid pixels in the selected area and comparing the number of valid or invalid pixels against a threshold number.

According to an eighth aspect of the present invention there is a method of checking a video output. The method comprises receiving incoming video data for rendering an image on a display, the video data comprising pixel data which comprise, for each pixel, a set of colour component values for a given colour model, comparing each colour component for a pixel in a selected area of the image with a corresponding test range of values and, if a component value falls outside the range, measuring a deviation, summing deviations for the selected area to provide an error value for the selected area and comparing the error value against a threshold number.

The method may be implemented in hardware.

Certain embodiments of the present invention will now be described, by way of example, with reference to the accompanying drawings, in which:

FIG. 1 illustrates dithering to generate virtual colours;
FIG. 2 illustrates a telltale overlaying live video;
FIG. 3 illustrates a partially-hidden telltale;
FIG. 4 illustrates some examples of telltales;
FIG. 5 is a schematic block diagram of a system for generating video data for an instrumentation display;
FIG. 5a illustrates an example of an expected image;
FIG. 6 is a schematic block diagram of a video output checker;
FIG. 7 illustrates monitored screen content;
FIG. 8 illustrates test data including a set of pixel test data;
FIG. 9 illustrates test data comprising pixel data taking the form of indices representing expected pixel colours;
FIG. 10 shows a list of indices and corresponding expected pixel colour;
FIG. 11 is a schematic diagram of a look-up table for converting an index into a set of ranges of acceptable colour component values;
FIG. 12 is a schematic block diagram of a data expander;
FIG. 13 schematically shows comparison of each colour component value for a pixel of incoming video data with a corresponding range of colour component values;
FIG. 14 is a process flow diagram of a method of comparing each colour component value for a pixel of incoming video data with a corresponding range of colour component values to identify valid pixels and of counting valid pixels;
FIG. 15 is a process flow diagram of a method of determining whether an image has been correctly displayed based on a counted number of valid pixels;
FIG. 16 illustrates a set of colour component values showing values which fall out of range and corresponding error values;
FIGS. 17A-17C collectively illustrate a process flow diagram of a method of comparing each colour component value for a pixel of incoming video data with a corresponding range of colour component values to determine an error value for a value falling outside the range and to accumulate error values to obtain an error value for the image;

Figure 1:
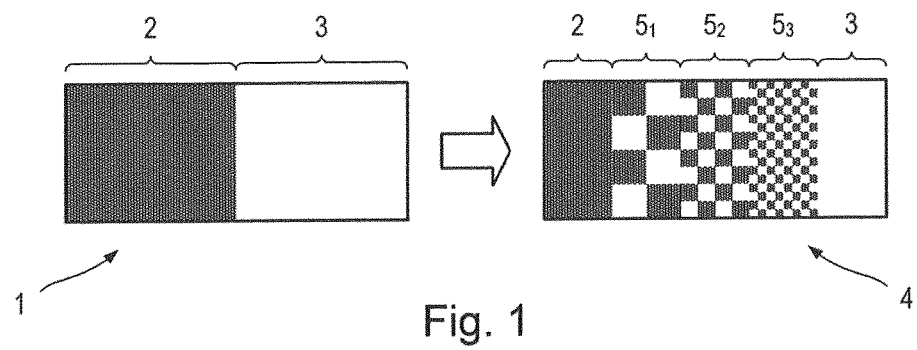
Figure 2:
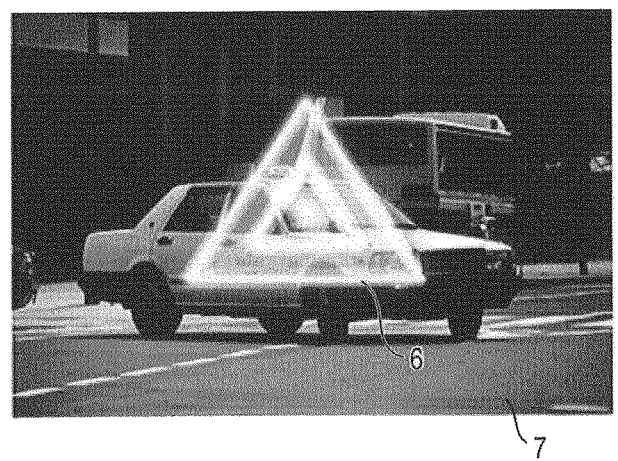
Figure 3:
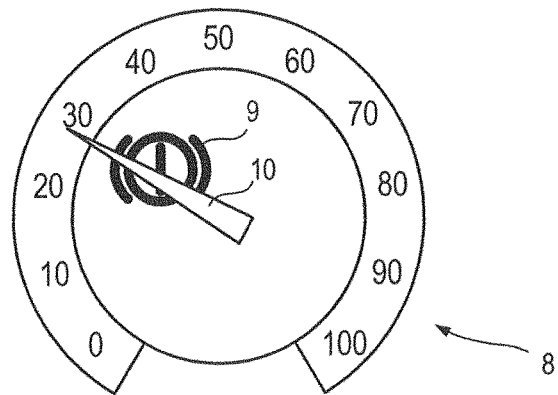
Figure 4:
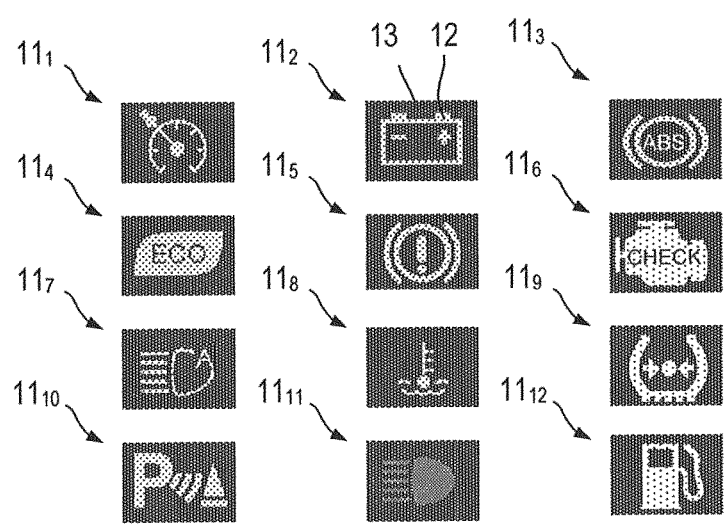

Referring to FIG. 4, some examples of telltales $11_1, 11_2, \ldots, 11_{12}$ which may be displayed in an automotive instrumentation cluster are shown. In FIG. 4, line and filled regions 12 may be coloured, for example green, red, yellow or blue. The unfilled and background regions 13 may be transparent or black.

For example, a first telltale $11_1$ which indicates that cruise control has been set may be green. A second telltale $11_2$ which indicates a battery problem may be red. A third telltale $11_3$ which indicates a problem with anti-lock brakes may be yellow. An eleventh telltale $11_4$ which indicates full (or "high") beam may be blue.

Referring to FIG. 5, an automotive instrumentation system 14 is shown. The system 14 includes a main controller 15, a display controller 16 and a display 17. The main controller 15 may generate or receive signals relating to automotive conditions and may forward instructions 18 and/or data 19 to the display controller 16. The display controller 16 generates and outputs video data 20 to the display 17 for rendering (i.e. displaying).

The video data 20 takes the form of a video data stream comprising a sequence of frames. The video data 20 may include vertical sync, horizontal sync, data and clock signals. The video data 20 may conform to video graphics adapter (VGA) standard, although other formats can be used. In this case, an RGB444 image format is used. However, other image formats can be used, such as RGB888 or Y'UV444.

The display 17 takes the form of a liquid crystal display thin-film transistor (LCD-TFT) screen having an active area 21. However, the display can take other forms, such as an organic light-emitting diode (OLED) screen, or a direct projector.

From time to time, one or more telltales 22 may be rendered on the display 17. The display controller 16 generates video data 20 which includes telltale image data. Herein, telltales 22 may also be referred to as "warning symbols" or simply "symbols". A telltale 22 may be the same, similar or dissimilar to the telltales $11_1, 11_2, \ldots, 11_{12}$ shown in FIG. 4.

A video output checker 23 (herein also referred to as "image checking device") is used to check whether the telltale(s) 22 is (are) properly displayed in an area 24 being monitored (herein also referred to as a "test area") by comparing the image displayed in the test area 24 with a corresponding expected image 25 (FIG. 5a). As will be explained later, a single video output checker 23 can be used to monitor two or more test areas 24 by inspecting different test areas 24 in different frames. Two or more video output checkers 23 can operate in parallel to monitor two or more test areas 24. Two or more test areas 24 may overlap or abut. More than one display 17 may be used and a single video output checker 23 can be used to monitor test area 24 on different displays.

Referring to FIG. 6, the video output checker 23 is shown in more detail.

The video output checker 23 receives video data 20 and video synchronisation data 30 from the display controller 16 (FIG. 5) and outputs status 31 and messages 32 to the main controller 15 (FIG. 5). The video synchronisation data 30 typically includes pixel clock (not shown), horizontal synchronisation (HSync) and vertical synchronisation (VSync)

The video output checker 23 includes an address generator 35, test data memory 36, data expander 37, a data comparator 39, a decision unit 40 (herein also referred to as "a discriminator") and a control interface 41.

Figure 7:
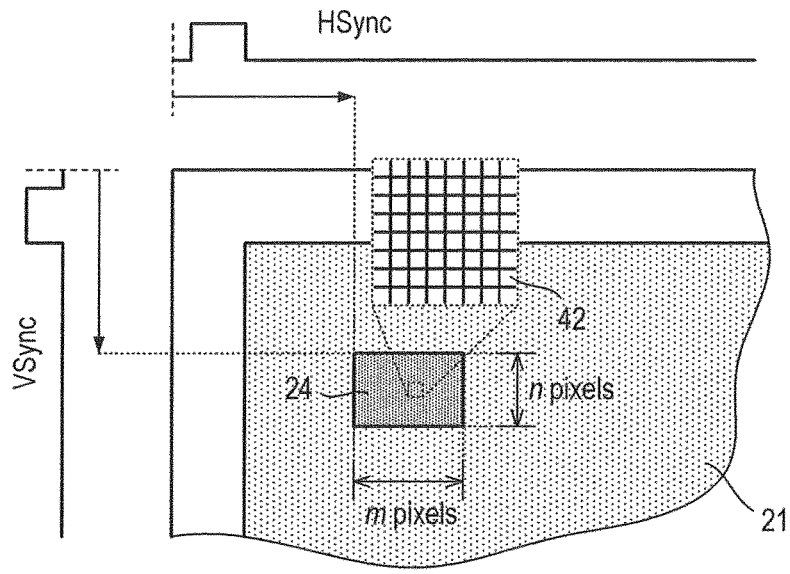

Referring also to FIG. 7, the address generator 35 identifies the area 24 of the active display content 21 to be monitored. The active area 24 is rectangular and comprises m by n pixels 42. Typically, the active area 24 comprises 100 by 100 pixels 42.

Figure 8:
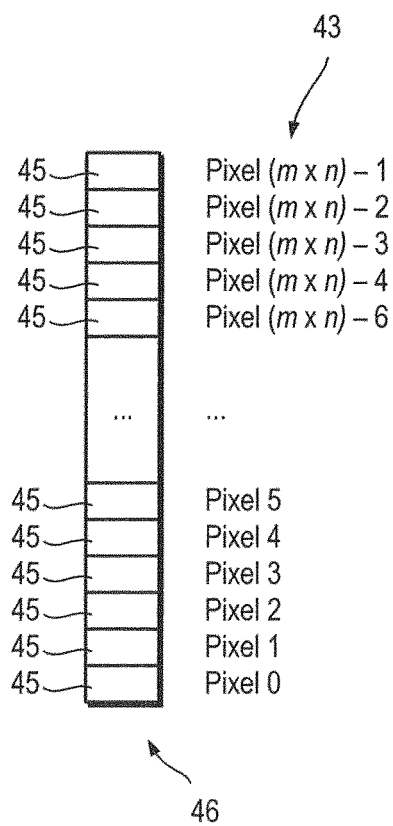

Referring also to FIG. 8, a set of test pixels 43 corresponding to the active area 24 are defined for an expected image 25 (FIG. 5a). The address generator unit 35 generates (absolute) addresses 44 for pixel test data 45 forming a set of test data 46 for the test pixels 43 checking the test area 24 (FIG. 5) to determine whether a telltale 22 (FIG. 5) is displayed correctly. Herein, the set of test data 46 is also referred to as "symbol test data" or "telltale test data".

The address generator 35 may store data 47 specifying the position and size of the test data 24. This data 47 can be programmed through the control interface unit 41.

Pixel test data 45 comprises information about the expected colour of a pixel 42 in the active area 24.

The pixel test data 45 can be stored as indexed colours. N-different colours can be stored for a set of test data, namely N−1 values each indicating a different colour and 1 value indicating that the colour of a pixel is not important (herein referred to as "don't care"). As will be explained in more detail hereinafter, if a pixel test data 45 is set to "don't care", then that test pixel can be ignored for the purposes of making a decision. This can make it easier to check for non-rectangular (or other irregularly-shaped) symbols.

Figures 9, 10:
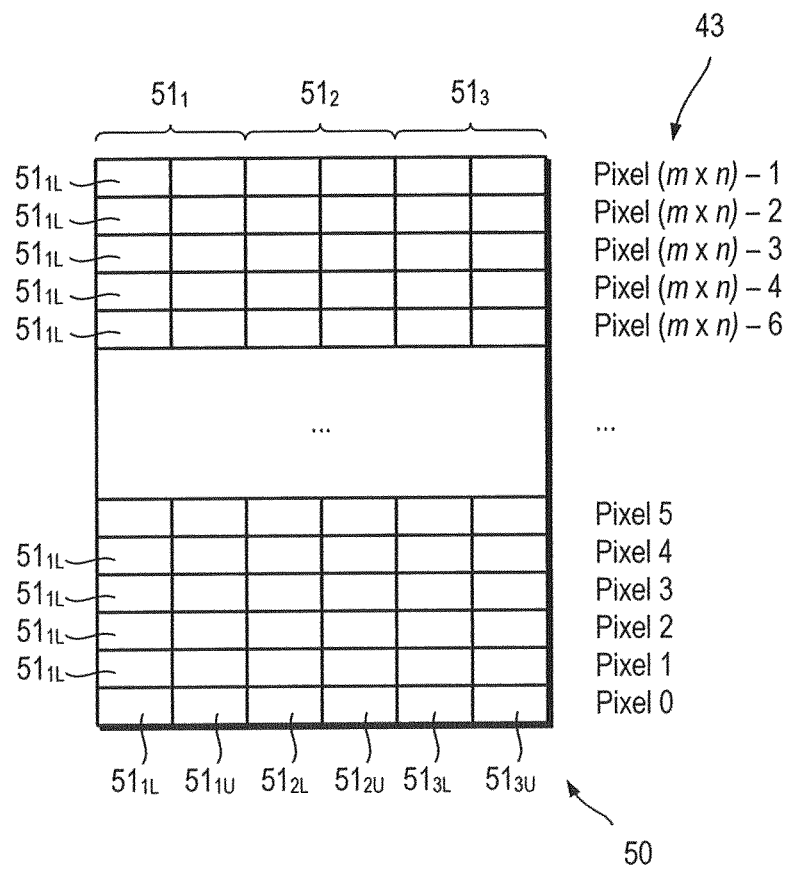

Referring in particular to FIG. 9, a table 48 is shown which illustrates a relation between pixel test data in the form of an index and corresponding colour. N=4 and so two bits of data can be used identify first, second and third colours (such as green, red and yellow) and "don't care". However, N may take other binary values (such as 2 or 8). N may take non-binary values. Using only two bits to identify colour can help to save data memory. However, if telltales 22 (FIG. 5) having more than three colours are required (for example, green, red, yellow and blue), then an additional video output checker 23 can be provided so as to handle additionally-coloured telltales 22 (FIG. 5). Two video output checkers 23 can be used to check overlapping test areas 24 (FIG. 5). One video output checker 23 can be used to check overlapping test areas 24 (FIG. 5), for example, by checking one test area 24 in one frame and checking another test area in a different frame.

Referring again to FIG. 6, test data 45 is read out from test data memory 36 and is supplied to the data expander 37.

The data expander 37 converts the test data 46 into expanded test data 50.

Referring also to FIG. 10, the data expander 37 maps index values 45 (FIG. 8) into pairs $51_1, 51_2, 51_3$ of component values $51_{1L}, 51_{1U}, 51_{2L}, 51_{2U}, 51_{3L}, 51_{3U}$ for a colour model (or "direct mapped colour") which is the same as the incoming video data 20. The component value pairs $51_1, 51_2, 51_3$ define upper and lower limits for a component values for each component.

In this example, an RGB model is used and so the colour components comprise red, green and blue components.

However, other colour models can be used, such as YUV, Y'UV or YCbCr. The index values are converted into pairs of red, blue and green component values $51_{1L}$, $51_{1U}$, $51_{2L}$, $51_{2U}$, $51_{3L}$, $51_{3U}$. In this example, 12 bits are used to encode pixel data. However, fewer or more bits, for example 24 bits, may be used to encode data. Thus, in this case each value $51_{1L}$, $51_{1U}$, $51_{2L}$, $51_{2U}$, $51_{3L}$, $51_{3U}$ can take a value between 0x0 and 0xF.

Referring to FIG. 11, a look-up table 52 is used to map each index value into a set of component values taking values when N=4. As shown in FIG. 11, lower and upper limits for the first, second and third colour components for a given index, i, take the value $(C1_{i,L}, C1_{i,H})$, $(C2_{i,L}, C2_{i,H})$ and $(C3_{i,L}, C3_{i,H})$ respectively.

For example, the colour may be green and so the component values $(C1_{i,L}, C1_{i,H})$, $(C2_{i,L}, C2_{i,H})$ and $(C3_{i,L}, C3_{i,H})$ may take values (0x0, 0x4), (0x8, 0xF) and (0x0, 0x4) respectively. The colour may be red and so the component values $(C1_{i,L}, C1_{i,H})$, $(C2_{i,L}, C2_{i,H})$ and $(C3_{i,L}, C3_{i,H})$ may take values (0x8, 0xF), (0x0, 0x4) and (0x0, 0x4) respectively. A colour may be yellow and so the component values $(C1_{i,L}, C1_{i,H})$, $(C2_{i,L}, C2_{i,H})$ and $(C3_{i,L}, C3_{i,H})$ may take values (0xD, 0xF), (0xA, 0xF) and (0x0, 0x4) respectively.

The component values $(C1_{i,L}, C1_{i,H})$, $(C2_{i,L}, C2_{i,H})$ and $(C3_{i,L}, C3_{i,H})$ for "don't care" are set to full range, in this case, (0x0, 0xF), (0x0, 0xF) and (0x0, 0xF) respectively. Thus, as will be explained in more detail later, when checking whether a component value of a pixel 42 (FIG. 7) falls within the respective test range, the component value will fall within the test range for "don't care" regardless of component values.

A corresponding full range can be set for "don't care" for other colour models.

The upper and lower values $51_{1L}$, $51_{1U}$, $51_{2L}$, $51_{2U}$, $51_{3L}$, $51_{3U}$ for a given entry index can be stored as a pair of values, one storing the values of the lower limits $51_{1L}$, $51_{2L}$, $51_{3L}$ and another storing the values of the upper limits $51_{1U}$, $51_{2U}$, $51_{3U}$.

For example, for an entry index which corresponds to yellow colour, assuming an RGB444 image format is used, the values stored in the look table are 0xDA0 and 0xFF4. Thus, the lower and upper limits $51_{1L}$, $51_{1U}$ for a first component are 0xD and 0xF respectively, the lower and upper limits $51_{2L}$, $51_{2U}$ for a second component are 0xA and 0xF respectively and the lower and upper limits $51_{3L}$, $51_{3U}$ for the third component are 0x0 and 0xF respectively.

Referring to FIG. 12, the data expander 37 may store the look up table 52 in the form of a programmable register. The register 52 comprises elements 54 storing component values 53 in pairs for different indexes 55 (one of which corresponds to "don't care") and different components 56. The values 53 in the register 52 can be programmed through the control interface unit 41.

Referring again to FIGS. 6 and 13, the data comparator 39 compares, component-wise, component values $57_1$, $57_2$, $57_3$ of pixel data 57 for a pixel 42 (FIG. 7) of incoming image data 20 within the test area 24 (FIG. 7) with pairs of component values $51_{1L}$, $51_{1U}$, $51_{2L}$, $51_{2U}$, $51_{3L}$, $51_{3U}$ of pixel data 50 for a corresponding test pixel 43 (FIG. 10) to judge whether the pixel is valid.

Determining Correct Display of a Telltale Based on Counting Invalid Pixels

Figure 14:
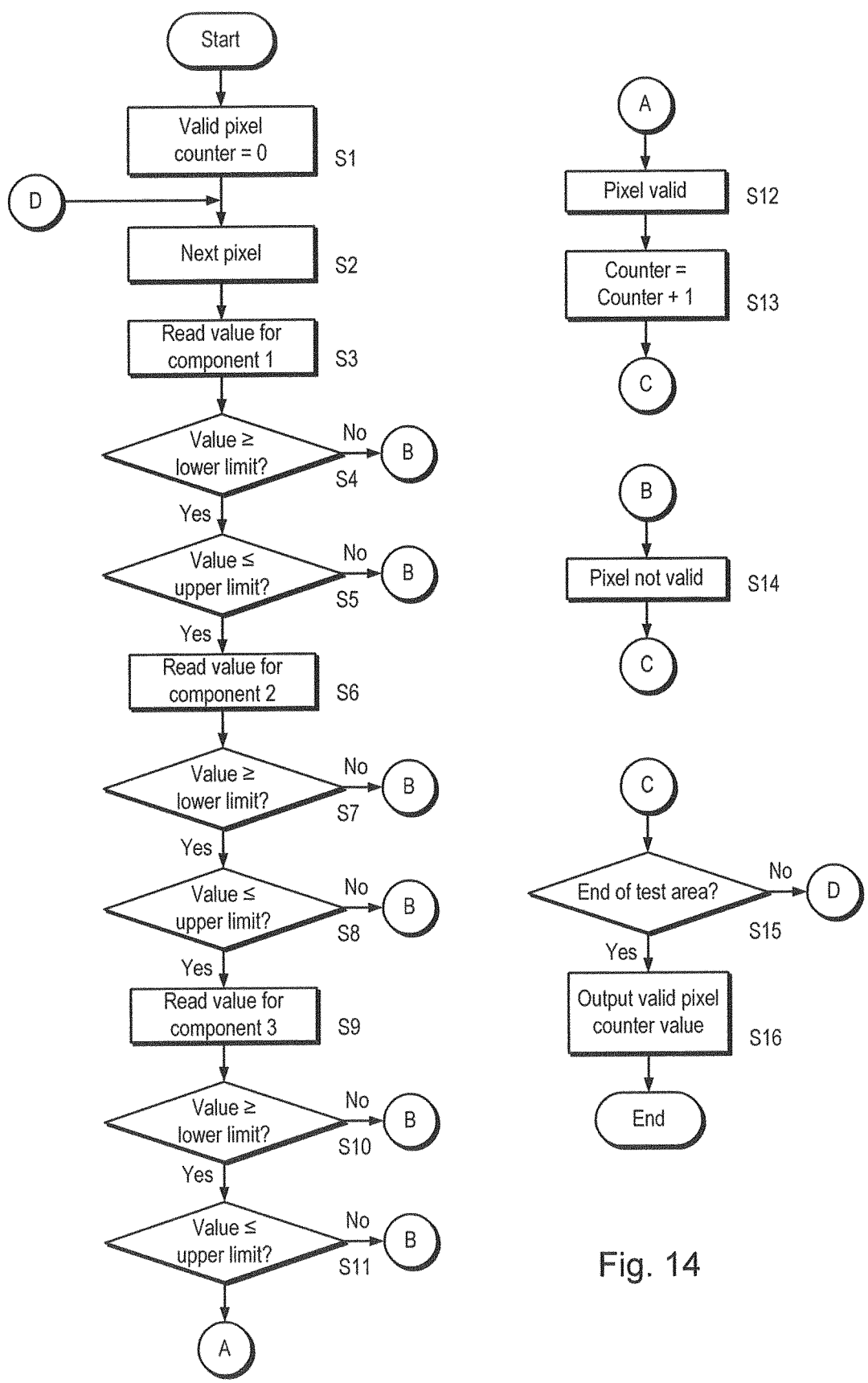

FIG. 14 is a flow diagram of a comparing and counting process carried out by the data comparator 39.

Referring to FIGS. 6, 13 and 14, when a new frame of video data is received, a valid pixel counter is reset (step S1).

The data compare unit 39 inspects pixel data 57 for a next (in this case, the first) pixel 42 (FIG. 7) in the test area 24 (FIG. 7) (step S2).

The data comparator 39 reads the first component value $57_1$ (for example, red component) of the pixel data 57 for the incoming image data 20 (step S3) and compares it against the lower and upper limits $51_{1L}$, $51_{1U}$ for the corresponding component (steps S4 & S5).

If the first component value $57_1$ falls with range, then the data comparator 39 reads the second component value $57_2$ (for example, green component) of the pixel data 57 for the incoming image data 20 (step S6) and compares it against the lower and upper limits $51_{2L}$, $51_{2U}$ for the corresponding component (steps S7 & S8).

If the second component value $57_2$ falls with range, then the data comparator 39 reads the third component value $57_3$ (for example, blue component) of the pixel data 57 for the incoming image data 20 (step S9) and compares it against the lower and upper limits $51_{3L}$, $51_{3U}$ for the corresponding component (steps S10 & S11).

If each component value $57_1$, $57_2$, $57_3$ falls in range, then the pixel is considered to be valid (step S12) and the valid pixel counter in incremented by one (step S13).

If, however, one or more of the component values $57_1$, $57_2$, $57_3$ falls outside range, then the pixel is considered to be invalid (step S14). The valid pixel counter is not incremented. Optionally, an invalid counter may be used to count invalid pixels.

The data comparator 39 determines whether all the pixels 43 in the test area 24 (FIG. 7) have been checked (step S15). If not, the data comparator 39 proceeds by inspecting the pixel data 57 for the next pixel 43 (FIG. 7) in the test area 24 (FIG. 7) (step S2) and repeating the process (steps S3 to S11 and either S12 & S13 or S14).

Once all the pixels 43 in the test area 24 (FIG. 7) have been checked, the data comparator 39 outputs a value 58 of the valid pixel counter to discriminator 40 (step S16).

Referring to FIG. 6, the discriminator 40 decides whether or not the telltale has been correctly displayed.

Figure 15:
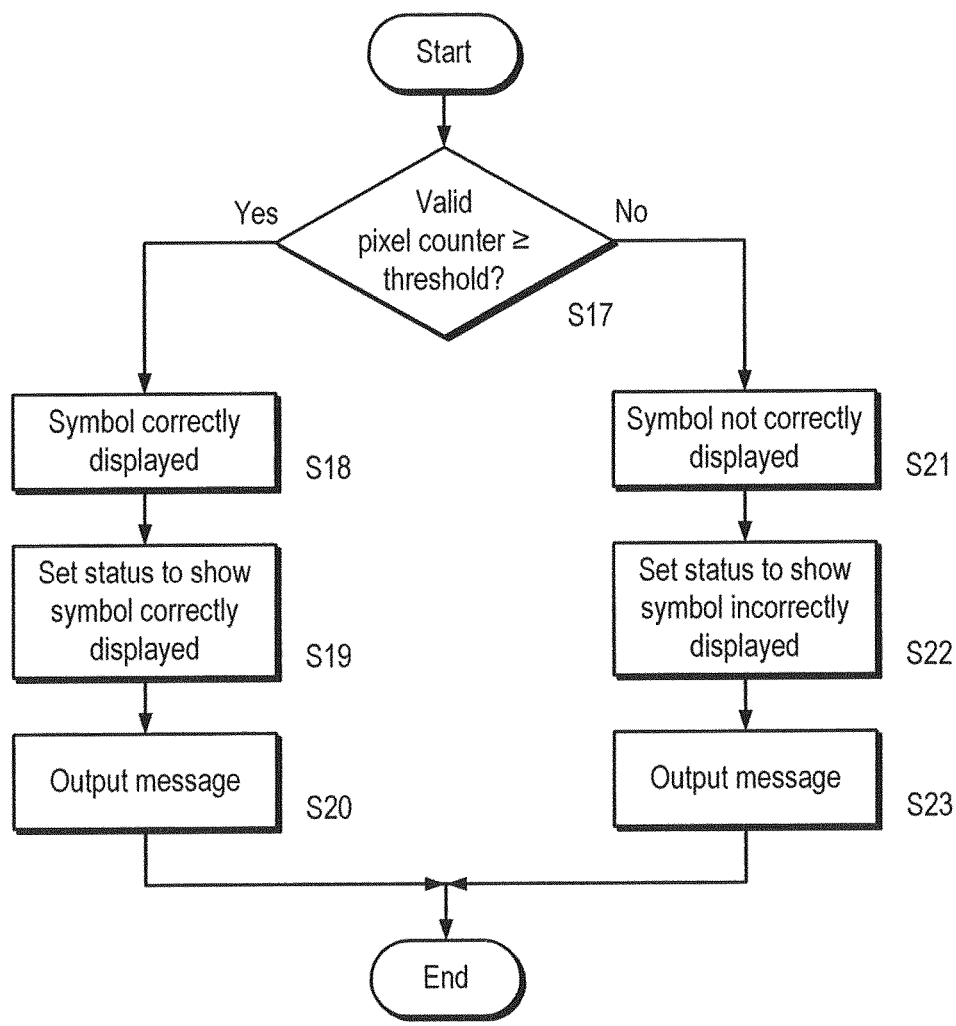

FIG. 15 is a flow diagram of a decision and action process carried out by the discriminator 40.

Referring to FIGS. 6 and 15, once a frame has been compared, the value 58 of the valid pixel counter is compared to a threshold value 59 (step S17). The threshold value may be at least 50% of tested pixels. For example, the threshold value may be 90% of tested pixels or more.

The discriminator 40 may store the threshold value 59 in the form of a programmable register. The values 59 can be programmed through the control interface unit 41.

If the measured value 58 equals or exceeds the threshold value 59, the discriminator 40 determines that the telltale has been correctly displayed (step S18). The discriminator 40 may set a flag 31 in a status register (not shown) and/or output a message 32 (step S19 & S20).

However, if the measured value 58 falls below the threshold value 59, then the discriminator 40 determines that the telltale has been incorrectly displayed (step S21). The discriminator 40 may set a flag 31 in a status register (not shown) and/or output a message 32 (step S22 & S23).

The message 32 (no error/error) can be programmed through the control interface unit 41.

Referring again to FIG. 6, the control interface 41 provides an interface to a main controller 15 (FIG. 5) or other external controller. Through the interface 41 it is possible to program the test data 46 (FIG. 8), the values 53 (FIG. 12) in the look-up table (FIG. 12), the data 47 (FIG. 6) regarding the position and size of the test area 24 (FIG. 7), the threshold value 59 for the result judgement and/or the messages 32, as well as other control information. The control interface 41 may also provide an interface to inspect the status 31 stored in the discriminator 40.

In the process hereinbefore described (hereinafter referred to as the "first process"), the data comparator 39 counts the number of valid (or invalid) pixels and the discriminator 40 compares this number against a threshold.

Additionally or alternatively, another process (or "second process") can be used in the data comparator 39 determines a so-called "pixel difference" for each pixel, in other words a measure of how much the colour of an actual screen pixel differs from a test pixel, and sums pixel differences over a test area 24 and the discriminator 40 compares the sum against a threshold.

The second process allows narrower ranges for test colour components to be used, but provide some latitude if many pixels are invalid (i.e. fall outside range) but only just fall outside range. This can afford greater control when determining whether or not a symbol has been displayed correctly.

Determining Correct Display of a Telltale Based on Measuring Pixel Difference

Figure 16:
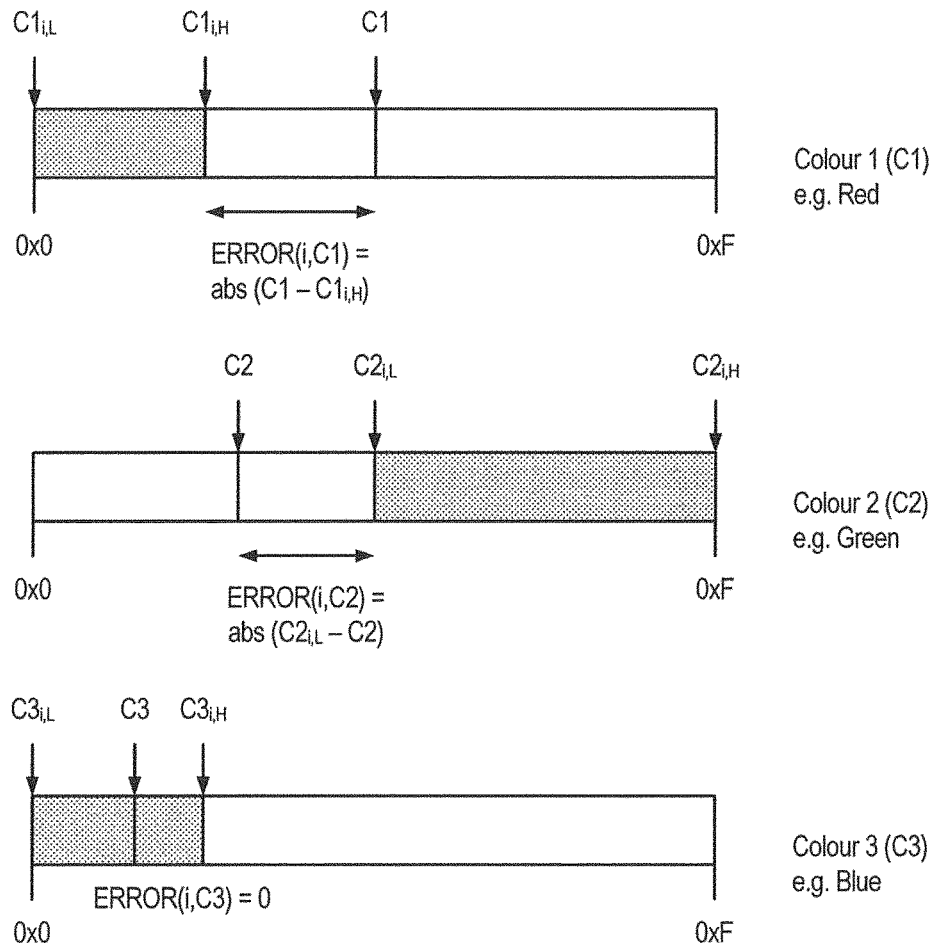

Referring to FIG. 16, the data comparator 39 (FIG. 6) can be used to measure, for each pixel i, a degree of deviation (or "pixel difference") of an actual screen pixel colour component value outside the respective colour component range. The deviation (or "difference") is expressed as an error value, ERROR(i, CX) where X=1, 2 or 3. For example, C1 may be red, C2 may be green and C3 may be blue. If the actual screen pixel component value falls within range, then the ERROR(i, CX) is zero. If the actual screen pixel component falls outside range, then the ERROR(i, CX) is equal to the absolute difference between the actual screen pixel component value and the closest threshold limit, which may be the upper or lower limit, i.e. ERROR(i, CX)=abs(CX−$CX_{iH}$) or abs ($CX_{iL}$−CX).

Error values ERROR(i, CX) for each colour component are added to determine an error value, ERROR(i), for a pixel, i.e. ERROR(i)=ERROR(i, C1)+ERROR(i, C2)+ERROR(i, C3).

Error values for all the pixels, i.e. 0, 1, . . . , i, . . . , (m×n)−1 are added to find a total error value, ERROR, for the test area. The discriminator 40 (FIG. 6) compares this total error value against an error value threshold.

Using this approach, the error value threshold can be set so as to allow, on average, a certain degree of deviation by a certain number of pixels. Thus, a symbol which might be recognisable to the user but which would otherwise be deemed to be incorrectly displayed by the first process can be judged to be correctly displayed.

Figure 17A:
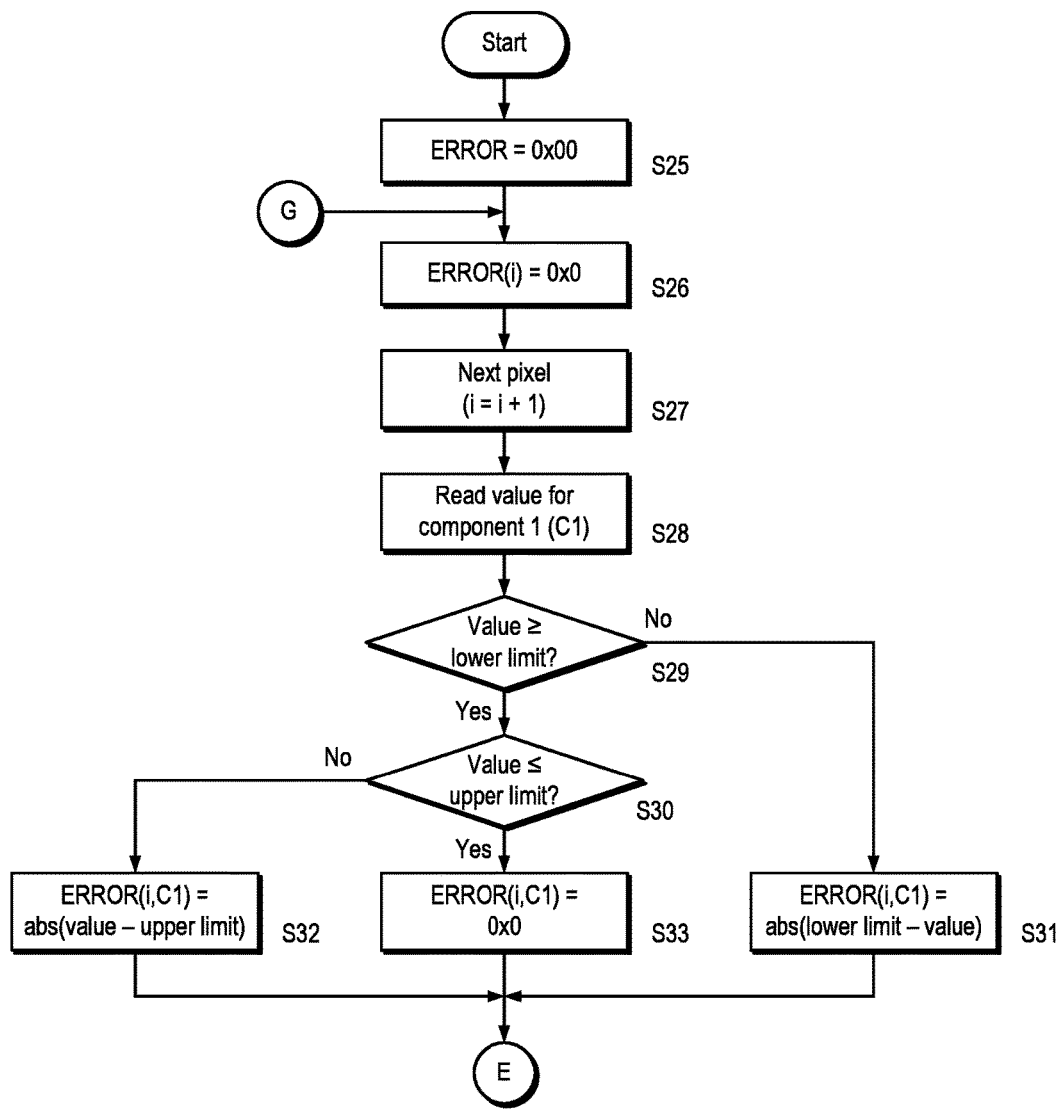
Figure 17B:
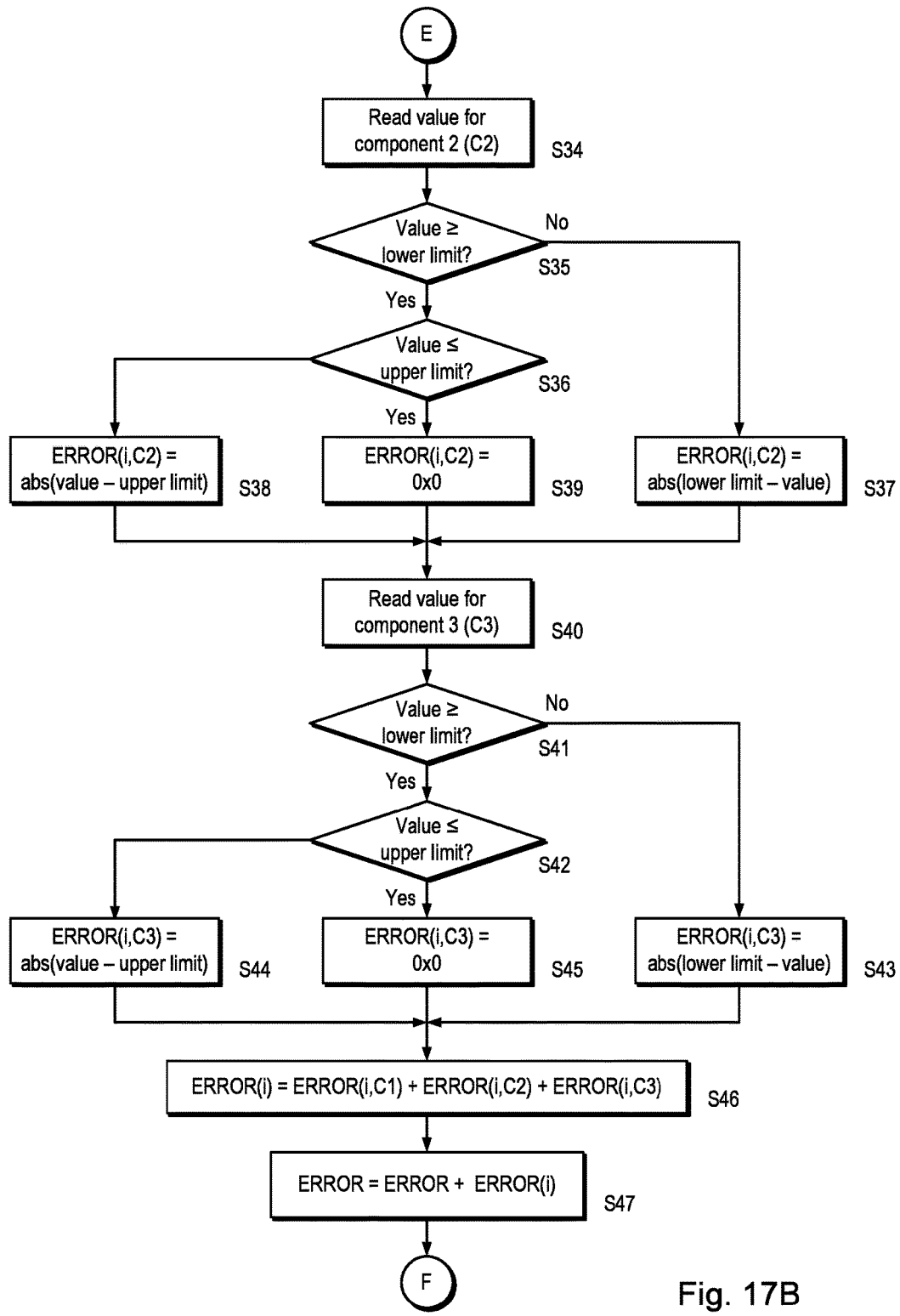
Figure 17C:
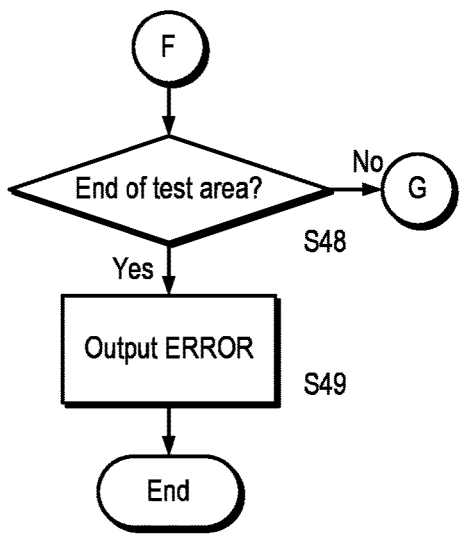

FIGS. 17A-17C collectively illustrate a flow diagram of comparing and counting steps carried out by the data comparator 39 (FIG. 6) in the second process. In this example, it is assumed that there are three colour components (C1, C2, C3) each component encoded with 4 bits, i.e. RGB444. However, other image formats can be used.

Referring to FIGS. 6, 13 and 17A, when a new frame of image data is received, an ERROR value register is reset (step S25).

A pixel ERROR value register is reset (step S26). The data compare unit 39 inspects pixel data 57 for a next (in this case, the first) pixel 42 (FIG. 7) in the test area 24 (FIG. 7) (step S27).

The data comparator 39 reads the first component value $57_1$ (for example, red component) of the pixel data 57 for the incoming image data 20 (step S28) and compares it against the lower and upper limits $51_{1L}$, $51_{1U}$ for the corresponding component (steps S29 & S30).

If the first component value $57_1$ falls below the lower limit $51_{1L}$, then the data comparator 39 determines ERROR(i, C1) by calculating an absolute value of the difference between the first component value $57_1$ and the lower limit $51_{1L}$ (step S31).

If the first component value $57_1$ is above an upper limit $51_{1U}$, then the data comparator 39 determines ERROR(i, C1) by calculating an absolute value of the difference between the first component value $57_1$ and the upper limit $51_{1U}$ (step S32).

If the first component value $57_1$ falls between the lower and upper limits $51_{1L}$, $51_{1U}$, then the data comparator 39 sets ERROR(i, C1) to 0x0 (step S33).

The same process is repeated for the second component value $57_2$ (for example green component) of the pixel data 57 (steps S34 to S39) and the third component value $57_3$ (for example blue component) of the pixel data 57 (steps S40 to S45).

The difference value, ERROR(i,CX) for each component (C1, C2, C3) are summed to yield a difference value, ERROR(i) for the pixel (step S46).

For example, the lower limits $51_{1L}$, $51_{2L}$, $51_{3L}$ may be represented by a value 0x000 and the upper limits $51_{1U}$, $51_{2U}$, $51_{3U}$ may be represented by a value 0x9FF. Thus, the lower and upper limits $51_{1L}$, $51_{1U}$ for the red component are 0x0 and 0x9 respectively, the lower and upper limits $51_{2L}$, $51_{2U}$ for the green component are 0x0 and 0xF respectively and the lower and upper limits $51_{3L}$, $51_{3U}$ for the blue component are 0x0 and 0xF respectively. If a screen image pixel has a value 0xB44 (i.e. the red component is 0xB, the green component is 0x4 and the blue component value is 0x4), the difference values ERROR(i,CX) for the red, green and blue component values are 0x2, 0x0 and 0x0 respectively and the difference value, ERROR(i), for the pixel is 0x2.

Steps S29 to S46 can be executed using a suitable function such as, for example:

Error(*i*)=max(cropneg(*C*1−*C*1*U*),cropneg(*C*1*L*−*C*1))+
max(cropneg(*C*2−*C*2*U*),cropneg(*C*2*L*−*C*2))+max
(cropneg(*C*3−*C*3*U*),cropneg(*C*3*L*−*C*3))

where cropneg(*x*) is {*x* for *x*>=0

{0 for *x*<0 and max(*x,y*) is {*x* for *x*>=*y*

{*y* for *x*<*y*

The data comparator 39 determines whether all the pixels 42 in the test area 24 (FIG. 7) have been checked (step S48). If not, the data comparator 39 proceeds by resetting the pixel ERROR register (step S26) and inspecting the pixel data 57 for the next pixel 43 (FIG. 7) in the test area 24 (FIG. 7) (step S27) and repeating the process (steps S28 to 47).

Once all the pixels 42 in the test area 24 (FIG. 7) have been checked, the data comparator 39 outputs ERROR value 58 to discriminator 40 (step S49).

The discriminator 40 (FIG. 6) decides whether or not the telltale has been correctly displayed.

Figure 18:
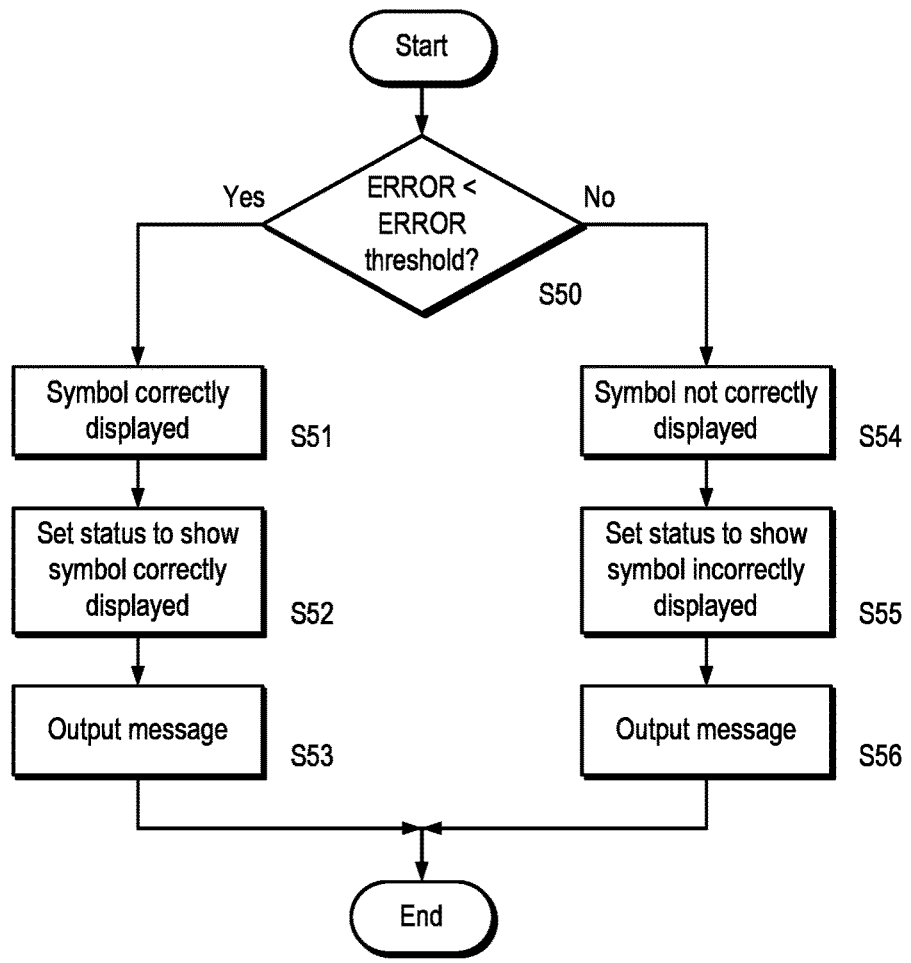
FIG. 18 is a process flow diagram of a method of determining whether an image has been correctly displayed based on an error value.

FIG. 18 is a flow diagram of a decision and action process carried out by the discriminator 40 in the second process.

Referring to FIGS. 6 and 18, once a frame has been compared, the ERROR value 58 of is compared to a threshold ERROR value 59 (step S50). The threshold ERROR value 58 may be set to, for example, a value closest to 5% of a maximum possible error for a frame.

The discriminator 40 may store the ERROR threshold value 59 in the form of a programmable register. The values 59 can be programmed through the control interface unit 41.

If the measured value 58 falls below the threshold value 59, the discriminator 40 determines that the telltale has been correctly displayed (step S51). The discriminator 40 may set a flag 31 in a status register (not shown) and/or output a message 32 (step S52 & S53).

However, if the accumulated ERROR value 58 is equal to or exceeds the ERROR threshold value 59, then the discriminator 40 determines that the telltale has been incorrectly displayed (step S54). The discriminator 40 may set a flag 31 in a status register (not shown) and/or output a message 32 (step S55 & S56). The discriminator 40 may issue an interrupt and store the index number of the failed monitoring area in the status register (not shown).

The message 32 (no error/error) can be programmed through the control interface unit 41.

Multiple Video Output Checkers 23

Referring again to FIG. 5, more than one video output checker 23 may be provided.

For example, up to four video output checkers 23 can be provided sharing a common single port RAM macro. This can help to reduce chip size, although this might limit the ability to monitor overlapping test area.

If more than one checker 23 is used, then they can operate in parallel. Parallel checkers 23 can monitor overlapping area. For example, four modules each running four checkers 23 can monitor up to 16 telltales in parallel.

Time Multiplexing

Although multiple video output checkers 23 can be used to check multiple telltales, a single video output checker 23 can also be used to monitor multiple telltales.

Figure 19:
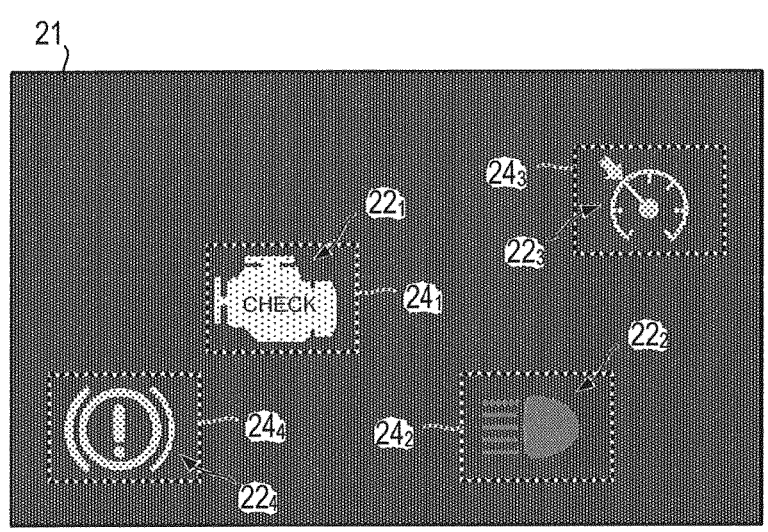
FIG. 19 illustrates an active area of a screen and displayable telltales.

FIG. 19 shows an active area 21 of a screen 17 (FIG. 5) in which multiple illustrative telltales $22_1$, $22_2$, $22_3$, $22_4$ can be displayed as-and-when required. The telltales $22_1$, $22_2$, $22_3$, $22_4$ are on a black background. Each telltale $22_1$, $22_2$, $22_3$, $22_4$ is different and, when displayed, are displayed in different parts of the active area 21. Each telltale $22_1$, $22_2$, $22_3$, $22_4$ has a corresponding test area $24_1$, $24_2$, $24_3$, $24_4$.

A first telltale $22_1$ is a yellow check engine symbol, a second telltale $22_2$ is dark blue high beam on indicator symbol, a third telltale $22_3$ is a green cruise control indicator symbol and a fourth telltale $22_4$ is a red break warning indicator symbol.

Figure 20:
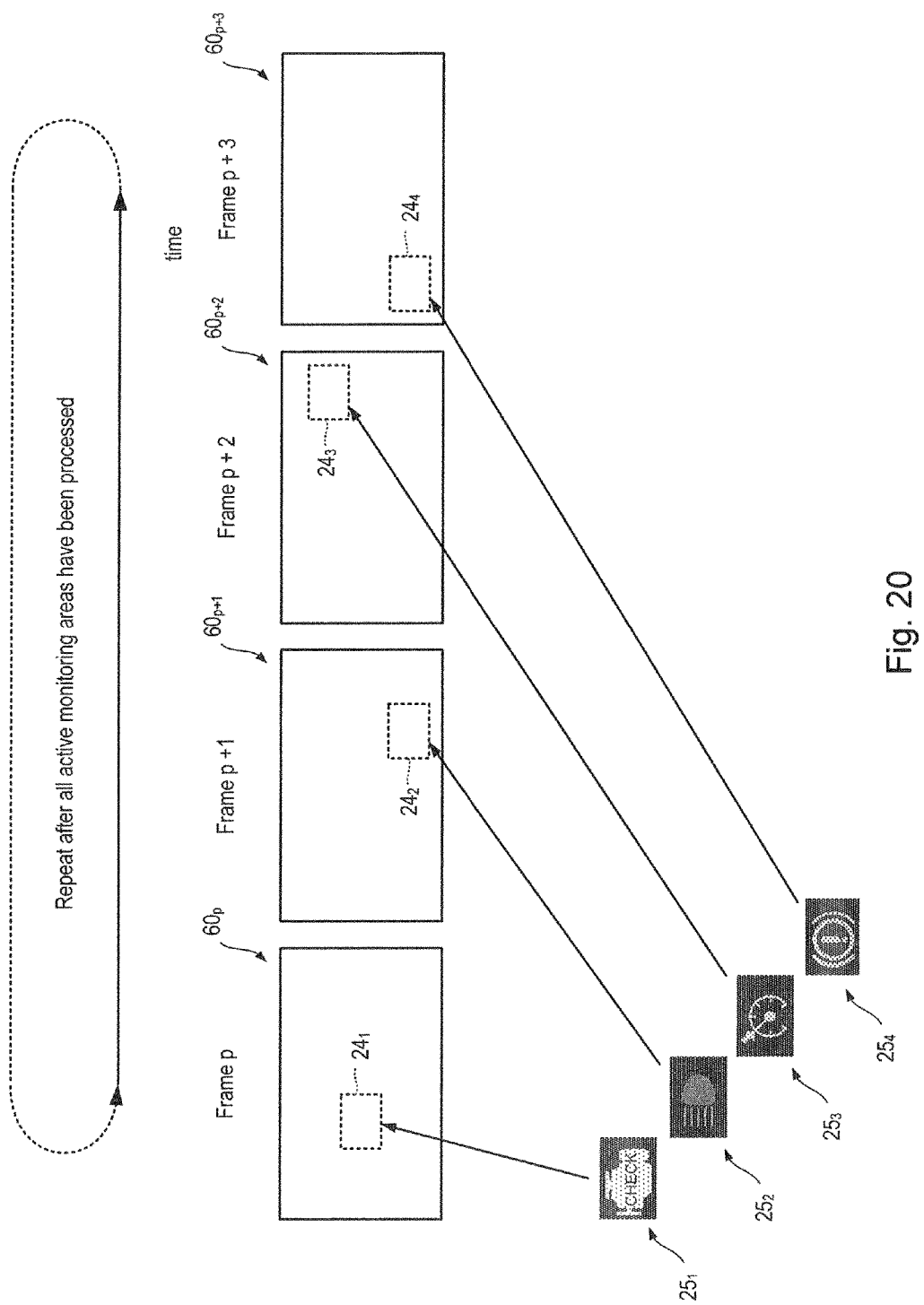
FIG. 20 illustrates time multiplexing whereby different test areas are monitored in different frames.

Referring to also FIG. 20, a single video output checker 23 (FIG. 5) running one checking process per frame can be used to monitor multiple telltales $22_1$, $22_2$, $22_3$, $22_4$ (for example up to 16 telltales) using time multiplexing.

The address generator 35 (FIG. 6) handles time multiplexed monitoring of multiple (enabled) test areas $24_1$, $24_2$, $24_3$, $24_4$. One test area $24_1$, $24_2$, $24_3$, $24_4$ is checked each frame $60_n$, $60_{n+1}$, $60_{n+2}$, $60_{n+3}$. Thus, after checking a first monitoring area $24_1$ in a first frame $60_n$, the video output checker 23 checks a second monitoring area $24_2$ in the next frame $60_{n+1}$ and so on. After all active monitoring areas $24_1$, $24_2$, $24_3$, $24_4$ have been processed, the video output checker 23 repeats the operation starting again with the first monitoring area $24_1$.

As shown in FIG. 20, the video output checker 23 can inspect different test areas $24_1$, $24_2$, $24_3$, $24_4$ containing different telltales $22_1$, $22_2$, $22_3$, $22_4$ (or the same test area in which different telltales can be displayed) in different frames $60_n$, $60_{n+1}$, $60_{n+2}$, $60_{n+3}$ to see if the corresponding expected image $25_1$, $25_2$, $25_3$, $25_4$ is displayed.

If video data 20 has a frame rate of at least 80 fps (i.e. each frame is displayed for no more than 12.5 ms) and the reaction time of a driver is considered to be, for example, 200 ms, then it is possible monitor up to 16 different telltales sequentially.

A combination of two or more video output checkers 23 and time multiplexing can be used. Thus, a combination of parallel checking and sequential checking can be used.

The process can be implemented as a hardware state machine which is reconfigured for each image, i.e. each frame. For example, a test area in a frame can be checked using a set of registers which define the colour look up table, geometry and test pixels. When the next frame is output, the registers can be switched to a new set of registers. Accordingly, it is possible to test several overlapping objects frame by frame.

The process can be used to check two or more video outputs. Input data can be switched from one video output to another video output.

For example, telltales can be sequentially tested on a first screen, a second screen and then the first screen again and so on.

Window Watchdog Timer

Referring to FIG. 5, the video output checker 23 automatically checks the timing of VSync and HSync because, if the timing of VSync and/or HSync is/are incorrect, then the test area 24 will be incorrectly positioned and the telltale checking process will yield an error result.

Figure 21:
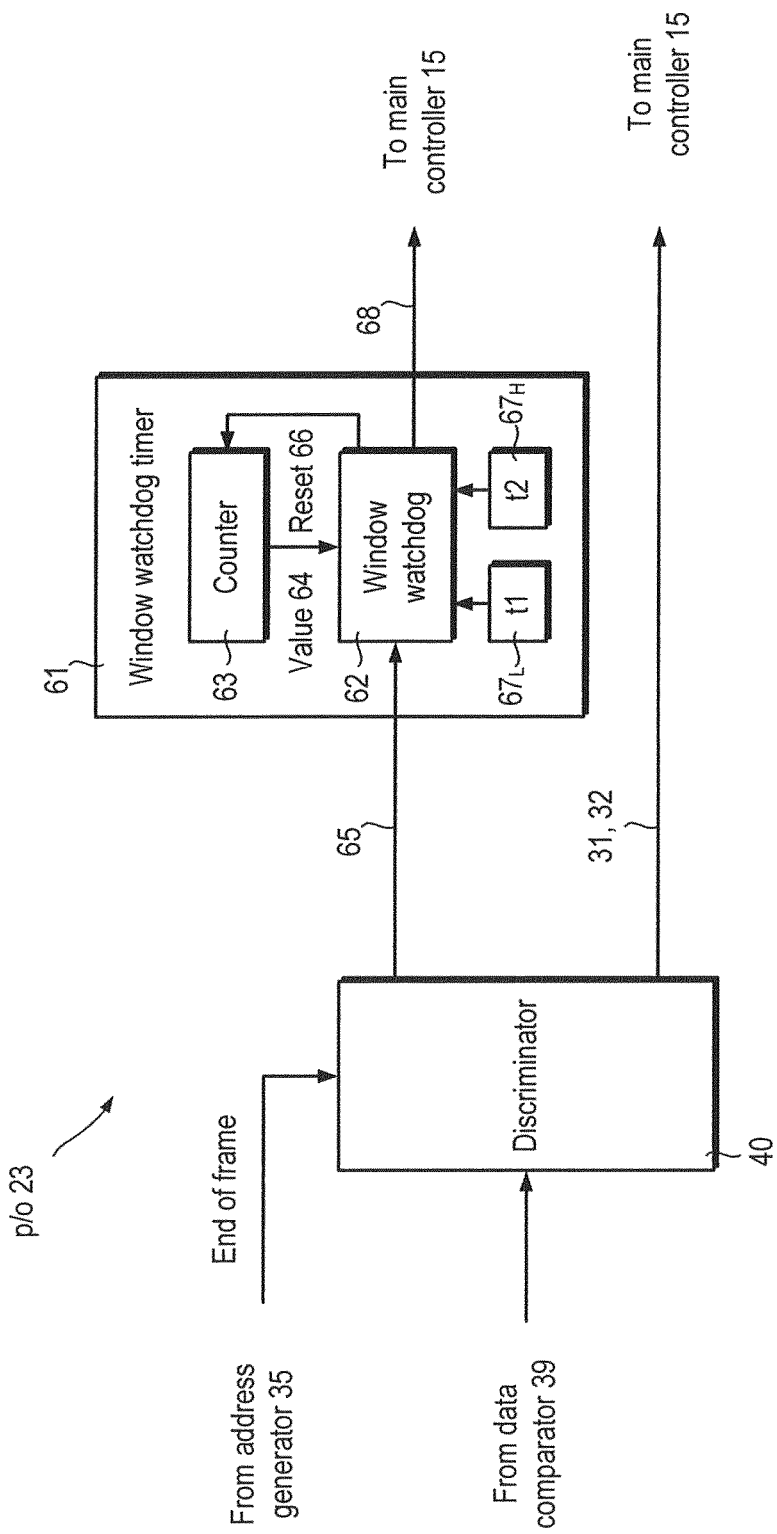
FIG. 21 is a schematic block diagram of a window watchdog timer.

Referring to FIG. 21, the video output checker 23 can include a window watchdog timer 61 to supervise the video output 20 (FIG. 5) and the video output checking process to confirm that the video output checking process of a frame is completed within a certain time window and, thus, verify that the video output 20 (FIG. 5) and checking process are operating properly.

The window watchdog timer 61 includes a window watchdog controller 62 and a counter 63 having a counter value 64.

Figure 22:
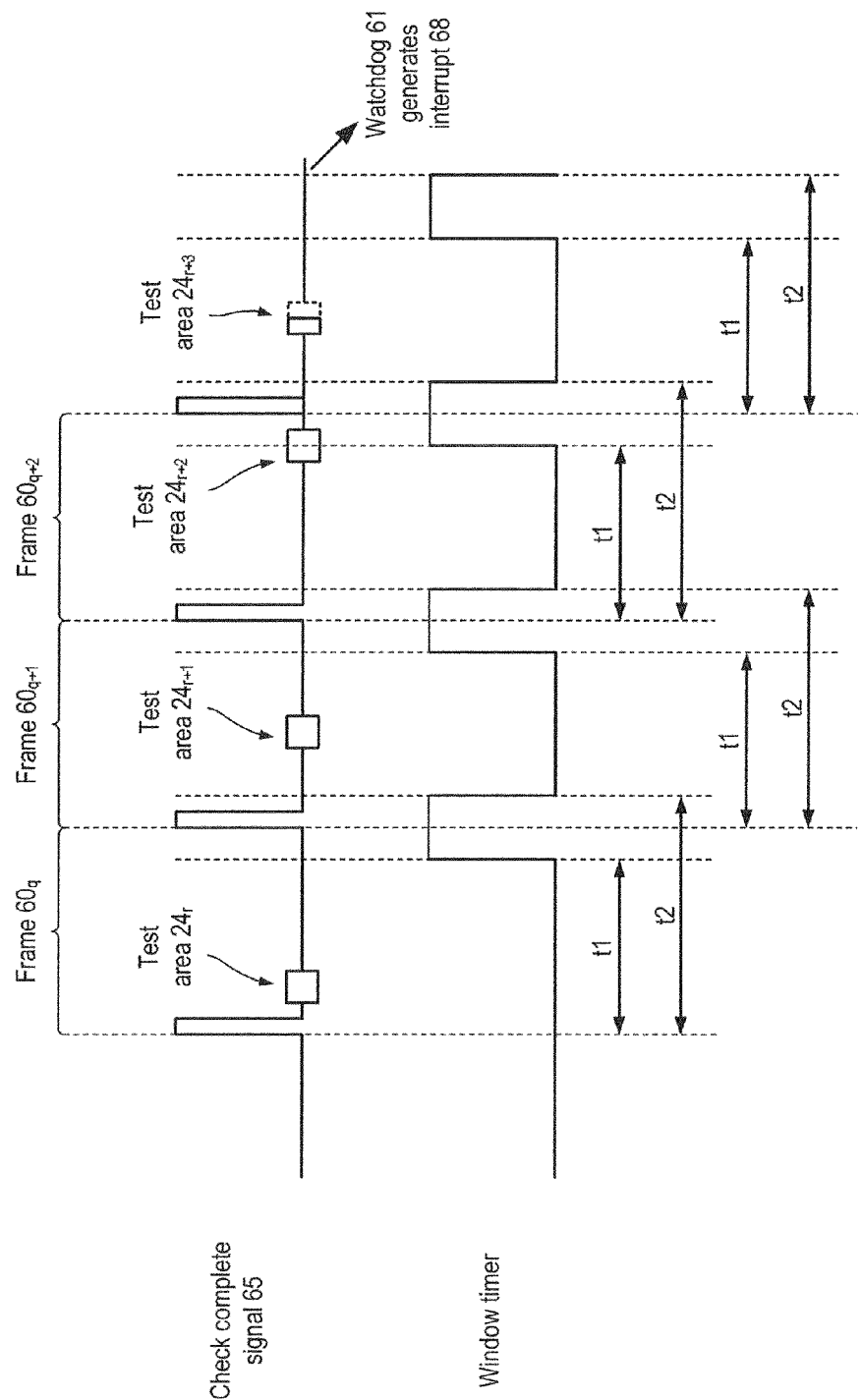
FIG. 22 is a timing chart of a process for confirming proper operation of a video output checker.

Referring also to FIG. 22, for a given frame $60_q$, after a video checking process for a test area $24_r$ has been completed, the discriminator 40 outputs a check complete signal 65 at the end of the complete frame $60_q$. The address generator 35 (FIG. 6) detects the end of a complete frame (based on sync data and by counting all the pixels in the frame) and signals the end of the complete frame to the discriminator 40. When the window watchdog controller 62 receives the check complete signal 65 from the discriminator 40, it provides a reset signal 66 to reset counter 63. Video checking process for the test area $24_{r+1}$ in the next frame $60_{q+1}$ is carried out and so on.

Prior to resetting, when the window watchdog controller 62 receives the check complete signal 65 from the discriminator 40, it compares the counter value 64 against lower and upper values $67_L$, $67_H$ so as to check whether the check complete signal 65 is received within a preset window of time, t1 to t2. The lower and upper values $67_L$, $67_H$ can be programmed.

If the check complete signal 65 is received before the start of a window (i.e. before t1) or after the end of the window (i.e. after t2), then window watchdog controller 62 generates and transmits a failure interrupt 68 to the main controller 15.

The window can be used to check whether the process is completed within, for example, ±10% of an expected completion time.

To give an example, a video output checking process can be performed every 16.6 ms for a display refreshing with a frame rate of 60 fps. Accordingly, the window watchdog timer 61 can be programmed to have a lower limit 67$_L$ of 15 ms and an upper limit 67$_H$ of 18 ms.

Therefore, if after 18 ms no frame complete signal 65 is received (for example, as shown in the last frame 60$_{q+3}$ in FIG. 22), the window watchdog timer 61 determines that video output checking is not properly operating. This might occur, for example, if a video output checking process does not finish checking a test area 24.

If the window watchdog timer 61 receives a frame complete signal 65 within 15 ms of a previously-transmitted frame complete signal 65, then the window watchdog timer 61 determines that the timing of the video output 20 (FIG. 5) is not set correctly or that the video output checking process could not check a complete image because, for example, the image has not yet been completely output.

Window watchdog timer can be used when time multiplexing is or is not used.

The video output checker 23 using the first and/or second process can have one or more advantages.

A human observer may not distinguish between small differences in colour and/or amplitude. However, if an overly-sensitive image checking process (such as one employing CRC) is used and there are slight, but imperceptible (to the human observer) differences in colour and/or amplitude, then an otherwise acceptably-displayed telltale may be dismissed as being improperly displayed.

Therefore, by checking ranges of colours and/or by designating certain pixels as being ones whose colour is unimportant, sensitivity of the video output checker 23 (FIG. 6) to images which, for example employ dithering or which blend with background data, can be reduced. Moreover, the ranges can be adjusted and/or the number and/or position of "don't care" pixels can be adjusted (even on a frame-by-frame basis) to (dynamically) alter sensitivity.

Moreover, the threshold value 59 can also independently be adjusted (optionally, on a frame-by-frame basis) to alter sensitivity.

Thus, the video output checker 23 can tolerate a greater variety in colour and shape of telltales and/or the degree of tolerance can be varied.

It will be appreciated that many modifications may be made to the embodiments herein before described.

For example, although video output checker 23 can be used in other, non-automotive applications, such as industrial control.

Although the video output checker 23 is based on an RGB colour model, other RGB colour models can be used, such as YUV, Y'UV and other similar colour models. Pixel in the video data 20 may be encoded using 12 bits, 24 bits or other amounts of bits.

Although the video output checker 23 is based on processing three component values, more (e.g. 4) component values may be used.

The video output checker 23 can run in the video output pixel clock domain. This means that the control interface 41 and result are re-synchronised.

We claim:

1. A video output checker which is configured to receive incoming video data for rendering an image on a display of a vehicle instrumentation cluster and to check whether a part of the image displayed in a fixed, predetermined area of the image is properly displayed by comparing the part of the image with a corresponding fixed, expected image, the fixed, expected image comprising an image of a telltale for communicating information regarding a state of the vehicle to an operator of the vehicle, the video data comprising pixel data which comprise, for each pixel, a set of colour component values for a given colour model, the video output checker configured to compare each colour component for a pixel in the fixed, predetermined area of the image with a corresponding test range of values and, if a component value falls outside the range, to measure a deviation, the video output checker further configured to sum deviations for the fixed, predetermined area to provide an error value for the fixed, predetermined area, and to compare the error value against a threshold number, and to output a message indicative of whether the image is properly displayed in dependence upon comparison of the error value against the threshold number.

2. A video output checker according to claim 1 which is configured to set a range of values each to be full range for preselected pixels such that the preselected pixels are determined to be valid.

3. A video output checker according to claim 1 which is configured to store test data comprising test pixel data which comprise, for each pixel, an index identifying one of a predetermined number of colours or whether colour is unimportant, and to convert the index into a set of ranges of values.

4. A video output checker according to claim 1, wherein the set of colour component values comprises a set of three colour component values.

5. A video output checker according to claim 1, wherein the given colour model is the RGB colour model and the colour components comprise red, green and blue.

6. A video output checker according to claim 1, wherein the test values are programmable.

7. A video output checker according to claim 1, wherein the threshold number is programmable.

8. A video output checker according to claim 1 comprising an interface to receive instructions for setting the test range values and/or the threshold.

9. A video output checker according to claim 1, wherein the fixed, predetermined area contains a telltale.

10. A video output checker according to claim 1, which is configured, after checking the fixed, predetermined area, to generate a signal at the end of a frame and to determine whether the signal is generated within a given time window.

11. A video output checker according to claim 1, which is configured to check a first area in a first fixed, predetermined frame and to check a second selected area in a second frame.

12. A video output checker according to claim 1, which is configured to check a first selected area on a first display and to check a second fixed, predetermined area on a second display.

13. A system comprising:
   at least two video output checkers according to claim 1, each video output checker configured to check a respective fixed, predetermined area of the image.

14. A system comprising:
   a display controller for generating video data for rendering on a display; and
   at least one video output checker according to claim 1 configured to receive and check the video data in the (respective) fixed, predetermined area(s).

15. An integrated circuit comprising at least one video output checker according to claim 1.

16. A video output checker which is configured to receive incoming video data for rendering an image on a display of a vehicle instrumentation cluster and to check whether a part of the image displayed in a fixed, predetermined area of the image is properly displayed by comparing the part of the image with a corresponding fixed, expected image, the fixed, expected image comprising an image of a telltale for communicating information regarding a state of the vehicle to an operator of the vehicle, the video data comprising pixel data which comprise, for each pixel, a set of colour component values for a given colour model, the video output checker configured to determine whether each colour component for a pixel in a fixed, predetermined area of the image falls within a corresponding test range of values so as to determine whether the pixel is valid or invalid and to count the number of valid or invalid pixels in the fixed, predetermined area, and to compare the number of valid or invalid pixels against a threshold number, and to output a message indicative of whether the image is properly displayed in dependence upon comparison of the number of valid or invalid pixels against the threshold number.

17. A video output checker according to claim 16 which is configured to set a range of values each to be full range for preselected pixels such that the preselected pixels are determined to be valid.

18. A video output checker according to claim 16 which is configured to store test data comprising test pixel data which comprise, for each pixel, an index identifying one of a predetermined number of colours or whether colour is unimportant, and to convert the index into a set of ranges of values.

19. A video output checker according to claim 16, wherein the set of colour component values comprises a set of three colour component values.

20. A video output checker according to claim 16, wherein the given colour model is the RGB colour model and the colour components comprise red, green and blue.

21. A video output checker according to claim 16, wherein the test values are programmable.

22. A video output checker according to claim 16, wherein the threshold number is programmable.

23. A video output checker according to claim 16 comprising an interface to receive instructions for setting the test range values and/or the threshold.

24. A video output checker according to claim 16, wherein the fixed, predetermined area contains a telltale.

25. A video output checker according to claim 16, which is configured, after checking the fixed, predetermined area, to generate a signal at the end of a frame and to determine whether the signal is generated within a given time window.

26. A video output checker according to claim 16, which is configured to check a first fixed, predetermined area in a first frame and to check a second fixed, predetermined area in a second frame.

27. A video output checker according to claim 16, which is configured to check a first fixed, predetermined area on a first display and to check a second fixed, predetermined area on a second display.

28. A system comprising:
at least two video output checkers according to claim 16, each video output checker configured to check a respective fixed, predetermined area of the image.

29. A system comprising:
a display controller for generating video data for rendering on a display; and
at least one video output checker according to claim 16 configured to receive and check the video data in the (respective) area(s).

30. An integrated circuit comprising at least one video output checker according to claim 16.

31. A method of checking a video output, the method comprising:
receiving incoming video data for rendering an image on a display of a vehicle instrumentation cluster, the video data comprising pixel data which comprise, for each pixel, a set of colour component values for a given colour model;
checking whether a part of an image which displayed in a fixed, predetermined area of the image is properly displayed by comparing the part of the image with a corresponding fixed, expected image, the fixed, expected image comprising an image of a telltale for communicating information regarding a state of the vehicle to an operator of the vehicle, by:
determining whether each colour component for a pixel in a fixed, predetermined area of the image falls within a corresponding test range of values so as to determine whether the pixel is valid or invalid and to count the number of valid or invalid pixels in the fixed, predetermined area;
comparing the number of valid or invalid pixels against a threshold number; and
outputting a message indicative of whether the image is properly displayed in dependence upon comparison of the number of valid or invalid pixels against the threshold number.

32. A method according to claim 31 which is implemented in hardware.

33. A method of checking a video output, the method comprising:
checking whether a part of an image which is displayed on a display of a vehicle instrumentation cluster in a fixed, predetermined area of the image is properly displayed by comparing the part of the image with a corresponding fixed, expected image, the fixed, expected image comprising an image of a telltale for communicating information regarding a state of the vehicle to an operator of the vehicle, by:
receiving incoming video data for rendering the image on the display of the vehicle instrumentation cluster, the video data comprising pixel data which comprise, for each pixel, a set of colour component values for a given colour model;
comparing each colour component for a pixel in a fixed, predetermined area of the image with a corresponding test range of values and, if a component value falls outside the range, measuring a deviation,
summing deviations for the fixed, predetermined area to provide an error value for the fixed, predetermined area;
comparing the error value against a threshold number; and
outputting a message indicative of whether the image is properly displayed in dependence upon comparison of the error value against the threshold number.

34. A method according to claim 33 which is implemented in hardware.

* * * * *